Dec. 12, 1939.   R. G. GUTHRIE ET AL   2,183,071
MEANS FOR CREATING A DISPERSION OF ONE FLUID IN ANOTHER FLUID
Filed Dec. 3, 1937
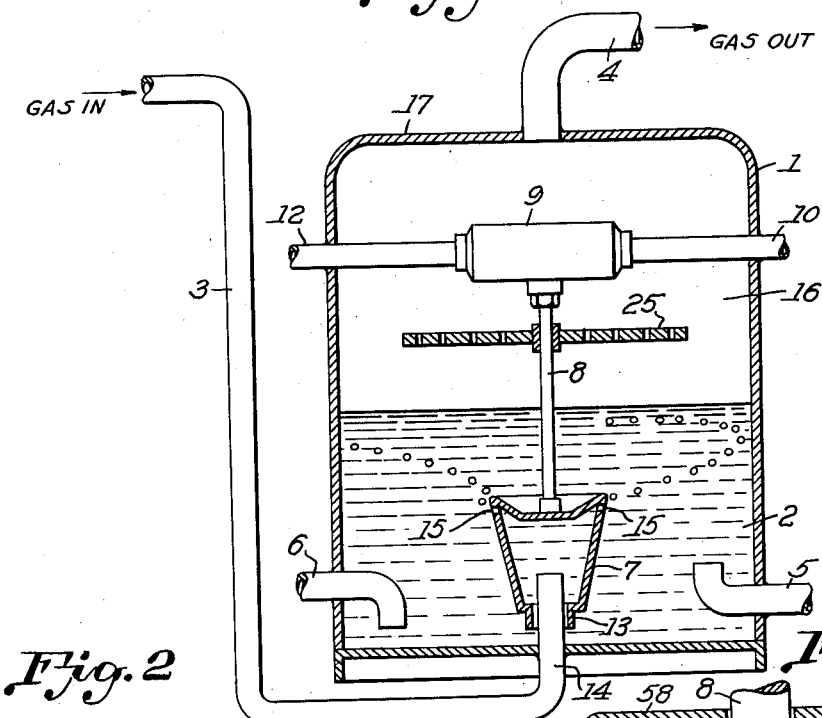
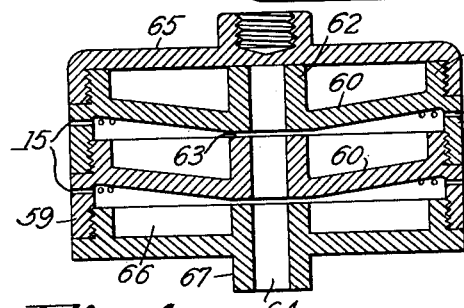
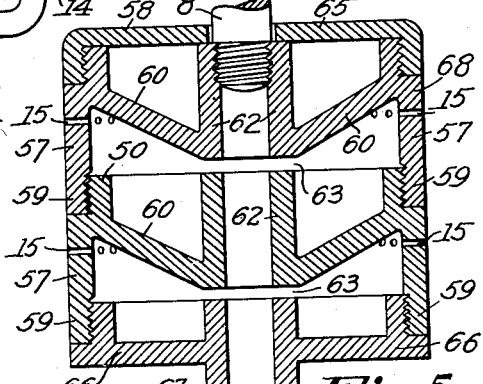
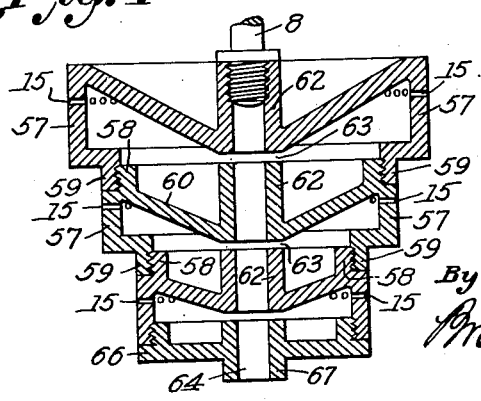
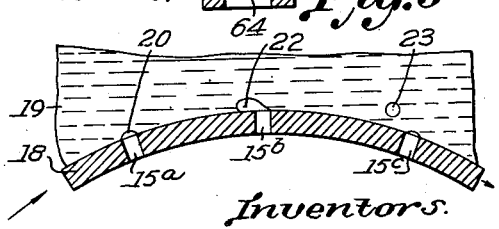
Inventors.
ROBERT G. GUTHRIE
OSCAR J. WILBOR
By Brown Jackson Boettcher Dienner
Attorneys.

Patented Dec. 12, 1939

2,183,071

UNITED STATES PATENT OFFICE

2,183,071

MEANS FOR CREATING A DISPERSION OF ONE FLUID IN ANOTHER FLUID

Robert G. Guthrie and Oscar J. Wilbor, Chicago, Ill., assignors to Peoples Gas By-Products Corporation, Chicago, Ill., a corporation of Illinois Application December 3, 1937, Serial No. 177,904

5 Claims. (Cl. 261—93)

The present invention relates to means for creating a dispersion of one fluid as the internal phase in another fluid as the external phase. In the practical arts, our invention is particularly suitable for the washing or purifying of gases for contacting gas and liquid and for contacting vapor and liquid. Other uses will at once be apparent to those skilled in the art.

There are now available in the art numerous means for accomplishing such washing or purifying of gases, and producing contact of gases or vapors or both with liquid but within our experience, we find that they all require rather bulky apparatus or entail the use of large amounts of energy. The efficiency of such devices is in general rather low, and can be improved only at the price of considerable increase in production costs.

To wash a gas or any gaseous fluid successfully requires that it be brought into intimate contact with the liquid medium in order to remove the undesired parts, which may be a liquid in the form of a fine mist, or a vapor, or which may be a gaseous component, or a solid component. There are three ways of removing the undesired parts or constituents of a gaseous mixture, first, by spraying the liquid in the gaseous fluid which latter is the external phase; second, by offering a great liquid surface to the gaseous fluid, which provides merely surface contact between two or more fluids, one of which maintains a surface, and third, by bubbling the gaseous fluid through a washing liquid which liquid constitutes the external phase. Inasmuch as the removal of the undesired component is performed by the liquid itself we have found that bubbling the gaseous fluid through the liquid is the most efficient, assuming that the bubbles are small enough and that the time of contact is sufficient.

The present invention provides an apparatus which satisfies both of the above requirements, namely, fine enough bubbles and adequate time of contact. The preferred form of the apparatus comprises a bell rotated at a very high rate of speed, such, for example, as around 4000 R. P. M. gaseous fluid enters the bottom of the bell, and is ejected through a number of small openings at or near the top by centrifugal force. Due to the centrifugal force, the small bubbles which are formed as will be later described, rise in a helical path, the liquid partaking of the motion of the bell and thereby creating currents which disperse the bubbles throughout the body of liquid. The apparatus may be enclosed in a gas-tight chamber and may be operated by a turbine placed inside the chamber, so that no moving parts pass through the walls.

Since the size of the bubbles will tend to increase with the volume passing through a given bell, the capacity may be increased by sub-dividing the bell into a number of chambers, each of which has its nozzles or orifices, and the gaseous fluid being distributed among the groups of nozzles or orifices by suitable partitions and a suitable manifold. This insures that there will be an even distribution of the gas to the respective rows of orifices or nozzles and also a substantially uniform size of bubbles from the respective orifices or nozzles. This is particularly important where the orifices are disposed at different radii from the axis of the device. The bell is submerged in a washing liquid to a depth which will provide a sufficiently long path for the gaseous fluid to travel so that the time of contact may be suitably controlled to secure the desired quantitative removal of the undesired components. Very little power is required to operate the bell, as it is of small diameter, and has a smooth surface of rotation. A very high efficiency is possible, inasmuch as the power requirements are very low. The apparatus is unusually compact and small in size. A small charge of washing liquid will serve for the treatment of a large volume of gas. Because of its high efficiency, this apparatus will in the relatively small chamber perform the same results as other apparatus, as, for example, the rectifying column of many times its height and diameter. It can be used not only for gas washing or purification, but also for vapor and liquid contact as in distillation. Because of its superior washing or contacting action, one bell can replace a number of bubbling caps in the rectifying column of a still or the like.

The secret of the operation resides in the control which the rotating nozzle provides over the fluid which is being dispersed. This is particularly the case where a gaseous fluid is dispersed in a liquid as the external phase.

The gas or other gaseous fluid issuing from a restricted orifice tends to form an interface contact, which is outwardly convexed as the gas issues, and as soon as the gas issues sufficiently to form a convexity which can be sheared off by the body of liquid because of the relative motion between the two, a bubble will be disconnected from the remainder of the gas and compelled to proceed as an independent body in the liquid. While a gas is here mentioned, it is to be understood that a mixture of gases or gases and vapors or vapor alone is intended to be included within the description of the mode of operation of the present device and its modifications.

Obviously, pressure may be employed for forcing the gaseous fluid out of the orifice of the bell or nozzle, but preferably we utilize the centrifugal force developed by the rotation of the bell. Obviously, a combination of the two forces may be utilized where desired.

In combination with the passing of a gaseous fluid into or through a liquid which tends to froth or foam, we provide a defoaming device which mechanically breaks the bubbles by developing a force greater than the surface tension which maintains the bubbles. This defoaming device serves not only to break any bubbles which may be formed, but also will precipitate by centrifugal action any spray or mist which rises from the liquid. This is highly desirable not only in avoiding loss of the liquid, but in effect drying the treated gas.

Now in order to acquaint those skilled in the art with the manner of constructing and operating our invention, we shall describe in connection with the accompanying drawing, a specific apparatus embodying our invention and the manner of operating and using the same.

In the drawing, wherein like reference numerals indicate like parts—

Figure 1 is a vertical section, largely diagrammatic, of a gaseous fluid and liquid contact apparatus wherein the gaseous fluid is the internal phase;

Figure 2 is a vertical longitudinal section of a spray head of our invention showing the sectional character of the same;

Figure 3 is a similar view of a modified form of spray head;

Figure 4 is a similar view of a further modification of the spray head; and

Figure 5 is a fragmentary diagrammatic illustration of the action involved in forming bubbles or drops as the case may be.

Referring first to Figure 1, a closed tank or container 1 is provided with a body of liquid 2 for washing a gaseous fluid such, for example, as a gas which is supplied through the gas supply pipe 3. The gas after washing passes out through the discharge pipe 4 at the top of the chamber. Liquid supply and discharge connections 5 and 6, respectively, may be employed or omitted, as desired. Suitable valves and the like will be utilized where desired.

Within the container 1, we dispose a bell or spray head 7 mounted on the lower end of a rotatable shaft 8 for rotation within the body of liquid 2. The shaft 8 is shown as being the shaft of a high speed water turbine 9 having an inlet pipe 10 through one side wall of the container 1, and an exhaust or discharge pipe 12, likewise extending through a wall of the container 1. The bell 7 is of generally conical shape with its larger end at the top. At its lower end which is of smaller diameter the bell is provided with a short neck 13 through which is extended a portion 14 of the gas supply pipe 3. A tight fit between the tubular extension 13 and the pipe 14 is not necessary, although, if desired, this may be provided. Any substantial entry of liquid into the bell 7 through the joint between the tubular extension 13 and the pipe 14 is undesirable as it results in a useless pumping of liquid which wastes power and sets up an undesirable swirling of the body of liquid. Also when any solids or fibrous material enters the bell, clogging of the orifices tends to destroy operation. The bell 7 has an outer surface of revolution about the vertical axis, in this case a truncated cone, so that it affords a very low degree and small amount of friction with the surrounding liquid 2. At or near the upper end of the bell or nozzle, a series of small openings 15 are formed. These openings preferably have their axes radial with respect to shaft 8. The bell need not be of large diameter. We have operated successfully a device in which the bell is approximately two inches in diameter at the larger end and wherein the openings 15 are of a size corresponding to a number 60 drill, that is, of a diameter approximately 0.040 inch, and spaced from each other a distance of approximately the diameter of the openings.

The shaft 8 is rotated at a high speed, for example, approximately 4000 R. P. M. The gas which is delivered by way of the pipe 3 enters the hollow interior of the bell or nozzle 7 and sufficient force is developed by the centrifugal action of the bell or nozzle 7 to drive gas out through the openings 15. Obviously, the pressure of the gas may be such as to assist in forcing gas out of the openings 15 in which event the two forces, namely, internal pressure and centrifugal force, work conjointly. In the operation of the device, as above described, that is, where the bell or nozzle 7 is submerged below the surface of the liquid 2 and gas is supplied to the interior of the same, a stream of exceedingly small bubbles is discharged from each of the numerous openings 15, and due to the motion of the bubbles and of the liquid itself, the liquid soon becomes charged throughout with gas bubbles of very small size. which follow a generally spiral helical path in an expanding helix from the nozz'es 15 to the surface where they are released into the gas space 16 and pass out the discharge pipe 4. Obviously if the gas is not to be delivered into a conduit, the top of the container 16 may communicate directly with the space into which the gas is to be discharged.

The means for driving the shaft 8 may be varied, but obviously the water turbine 9 affords a means for operating the shaft without opportunity for leakage of gas at a packed joint, such as is necessary if the shaft is extended through the wall of the container.

The turbine 9 is shown as supported upon the pipes 10 and 12, but obviously, it may be supported otherwise from the walls of the container or upon the inside of the head 17, which in that case may be made removable.

The operation of the rotatable nozzle is unique. We have indicated the mode of operation of the same in Figure 5. A part of the wall of the bell or nozzle 7 is indicated at 18 in Figure 5 and it is assumed that this wall is rotating on a vertical axis in Figure 5, which axis is the center of curvature of the wall 18. A part of the surrounding body of liquid is indicated at 19 contacting this circular wall, and it is assumed that gas is supplied to the inner ends of the openings 15a, 15b, and 15c. The gas, due either to its static pressure, or to the centrifugal force which it has imparted thereto or both, will tend to force the liquid away from the outer end of the opening, that is, the orifice, to form a convex outwardly bulged film which is the interface between the gas and the liquid. This film exhibits surface tension, and if the gas, liquid and other parts were in a static condition, the projection would continue to enlarge until a bubble were formed of sufficient size that the difference in gravity, that is, the flotation of the bulbous body of gas in the liquid would be great enough to break the surface tension of the film and to detach itself. That is the usual operation of bubbling a gas through a liquid.

In this case, however, the detachment of a bubble is not predicated upon the buoyant power of a gas body to break the surface tension of a film, but an additional force is supplied, which may be likened to the manner in which a soap bubble is detached from a pipe upon which it is blown, namely, by a relatively rapid sidewise motion of the orifice with respect to the bubble, or of the bubble with respect to the orifice. Thus in Figure 5 the projection of the gas into the liquid, as indicated at 20, is not great enough in the static condition to cause the detachment of a bubble from the orifice 15a. However, since the wall 18 is rapidly rotated in a clockwise direction, as viewed at 8, such a projection as is indicated at 20 cannot be maintained, and instead the body of gas as soon as it can be scraped off of the orifice by the difference in motion between the wall 18 and the liquid 19 will be detached, as is indicated at 22 where the liquid 19 in effect pushes the gas to the left of the orifice 15b as soon as sufficient gas has been projected from the orifice that the motion between the wall 18 and the liquid 19 can shear off a body of the gas. This gas is then detached, as indicated at 23 from the orifice 15c and becomes an independent gas body or bubble within the liquid 19, which latter is the external phase of the mixture.

Now it may be seen that very minute bodies of gas in enormous numbers may thus be detached from the orifices at the interface between the liquid and the rotating bell or nozzle. The smaller the openings 15 are made and the higher the speed, the more finely within limits may the gas be dispersed in the liquid.

The effect of projecting the gas out of the minute openings when they are sheared off by the difference in speed of the bell with respect to the substantially stationary liquid is somewhat similar to rubbing or grinding off minute bodies of gas.

The liquid tends to partake of the motion of the spinning bell, and will gradually acquire a swirling motion, but at a very much lower speed. This swirling is on a vertical axis around the bell 7, and may be controlled by suitable stationary vanes for braking the motion of the body of liquid.

The conical shape of the bell tends also to produce a vertical swirling action in that the centrifugal force produced by the contact of the liquid with the large diameter portion of the bell tends to cause an upward and outward travel of the liquid by the adhesion of the liquid to the surface of the bell. This, however, is not of prime importance, and may be omitted by making the bell of cylinder form if desired.

Obviously, the bell may be shaped otherwise than as shown. The sides thereof may have a configuration to maintain the friction between the surface thereof and the surface of the liquid at a minimum. Thus, for example, the bell may be made shorter axially. The tapered wall may be concaved instead of straight, and numerous variations in form may be made without departing from the above teaching. Also, it is to be understood that the bell may be divided by internal partitions into a number of chambers to provide rows of orifices 15 throughout the axial length of the bell, as illustrated in Figures 2, 3 and 4, to increase the capacity of the bell or nozzle. In that event, an internal manifold may be provided for distributing the gas to the various subdivisions or chambers through the means of restricted openings into the respective chambers which insure a proper distribution of the gas to the various rows of nozzles. This is particularly important where the nozzles are disposed at different radial distances from the axis of rotation. Where the liquid 2 is of such a character that the injection of the gas bubbles into the same tends to create a froth or foam or produce a spray of liquid or mist in the gas space, the defoamer shown at 25 may be employed. This defoamer is a thin disc provided with perforations through the same and mounted for rotation at relatively high speed at the level where foaming is to be stopped or limited. The defoamer has the unique property of breaking the walls of the gas bubbles by imparting energy to the liquid particles which constitute the walls so that they acquire a tearing force in excess of the film strength which forms the bubbles. The defoamer should cover a substantial part of the cross section of the container or should cover the major part of the surface which is to be defoamed. The perforations permit of the passage of gas therethrough. The velocity or energy imparted to the liquid which forms the film is such as to release the gas from the bubbles by causing sufficient of the liquid to be knocked from or driven off of one part of the surface of the bubble so that the gas is released. In like manner any spray of the liquid or mist produced by passing the gas through the body of washing liquid will be subjected to the effect of the disc 25. Such disc rotating at high speed and covering substantially the cross section of the gas space, causes disentrainment of the liquid particles from the gas both by contact where that occurs and by the centrifing effect of the gaseous medium beyond its edges. The defoaming disc is thereby highly effective in drying the gas which is passed through the machine.

The spray head may be built up of a plurality of sections, such for instance as those shown in Figures 2, 3, and 4. Each section 57 comprises an upper threaded portion 58 threaded externally and a lower depending skirt portion 59 threaded internally whereby any number of these sections may be united to form a multiple spray head. Each section 57 has a series of orifices 15 preferably evenly spaced about the periphery and being formed in the depending skirt portion 59. A transverse partition 60 carries a central hollow hub 62, the hollow passageway in the hub portion forming in conjunction with cooperating hub portions of adjacent sections, a manifold, and these hubs of respective sections being spaced apart from each other as indicated at 63 to provide communication between the manifold passageway 64 and the various chambers defined by the transverse partition 60. The upper end of the uppermost section is closed off by a cap member 65 which has a central threaded hub for receiving the threaded end of the driving shaft. The bottom cap 66 closes the lowermost section, except for the central passageway 64 forming its hub 67. Any number of sections may be assembled to form a corresponding multiple spray head or bell.

The structure shown in Figure 3 is substantially identical with that shown in Figure 2, except that the proportions are varied in order to space the rows of nozzles 15—15, and to provide passageways such as the gap 63 between adjacent hubs and larger passageways forming the apertures 15 where such proportions are desired, as, for example, in discharging liquid in case of a head 6, whereas gases are discharged by the head of Figure 2.

In Figure 4 we have indicated how the segments may be formed of different diameters in order to provide a stepped nozzle or cone where that is desired. The theory of operation in each of these is substantially the same, except that where different diameters are provided on the rotating bell or nozzle, there is a tendency for the surrounding fluid, that is the fluid of the external phase, to be circulated by partaking not only of the rotational travel of the bell or body, that is, a swirl on a vertical axis, but also a circulation of a helical character in toroidal form, that is to say, for example, in Figure 1, the body of liquid 2 not only partakes of the rotation of the bell 7 and swirls on a vertical axis, but the liquid in contact with the bell 7 will tend to travel upwardly at the central part of the body and downwardly out along the walls of the container 1, whereby a very thorough dispersion of the gases in the liquid is secured.

It is to be observed that in each of the forms shown the fluid pressure at the outer ends of the openings in each chamber or section of the rotatable head is the same. This is because the openings from each chamber terminate at the same radius and the flow of fluid to each chamber is controlled by flow restrictions from the manifold to the corresponding chamber.

In the rectifying column or columns of a still or the like the present device has peculiar value because of the very fine and thorough dispersion of vapors in liquids. Thus a better action and great saving in space is possible.

The space efficiency and the small requirement for power make this device highly advantageous in a wide variety of operations in the industrial arts.

While in the description of specific embodiments we have specifically referred to a gas as the specific form of gaseous fluid which our invention contemplates this is by way of illustration and not of limitation, as the invention applies to gaseous fluids brought into contact with liquids and vice versa. Also our invention applies broadly to contacting one fluid with a different fluid where it is advantageous to employ the present invention to do so.

It will be apparent to those skilled in the art that the illustration is largely diagrammatic and that the forms and proportions may be widely varied, so long as they come within the spirit and scope of the appended claims.

We claim:

1. Gas and liquid contact apparatus comprising a closed contact chamber having a gas space at its upper end and a liquid space in its lower end, means for dispersing a gaseous fluid in a liquid, comprising a rotary spray head for discharging the gas by centrifugal force, a vertical shaft for said head, said chamber having inlet and outlet means for the gas, and rotary means for disentraining by centrifugal force liquid spray and foam which enters the gas space.

2. Fluid contact apparatus comprising a closed tank adapted to hold liquid and gas, a rotary spray head mounted for rotation on a vertical axis disposed in said tank, said head having an opening at its lower end for the entry of fluid and having a vertically disposed driving shaft extending upwardly, a conduct for introducing fluid into said spray head, said conduit having an outlet disposed in register with the opening in the bottom of the head, an outlet for gas at the top of the tank, and a fluid pressure operated motor having a driven element connected to said driving shaft of the head and having a casing through which the said shaft projects, the joint between said casing and said shaft opening into the tank.

3. In combination, a closed chamber having a gas outlet at its upper end, a gas inlet at the lower end, a hollow circular rotatable gas nozzle having an inlet at its lower end and in communication with said gas inlet, said chamber being adapted to retain a body of liquid in which the nozzle is submerged, said nozzle having several tiers of openings which extend from the inside of the nozzle to the periphery, there being a central passageway for gas extending vertically from the inlet of the nozzle into communication with the respective tiers of openings and flow restrictions between the passageway and the respective tiers to equalize substantially the discharge of bubbles of gas from the respective tiers at their respective distances of submergence.

4. Means for dispersing a gaseous fluid in a liquid comprising the combination of a hollow body of circular cross section having a smooth external surface, said surface being a surface of revolution about the axis of the body, the body being mounted for rotation on said axis, said body having sidewalls which are pierced by a plurality of circumferentially spaced fine tubular openings of the order of 0.10" to 0.01" for the discharge of gaseous fluid from the inside of said hollow body, said openings terminating flush with said outer surface of revolution, means for maintaining a bath of liquid about said body and in which bath the body is submerged, said bath being of sufficient radial extent about said body to permit the particles of gaseous fluid to travel extensively in spiral upward paths in the liquid, whereby extensive and intimate interface contact between the particles of gaseous fluid and the liquid is maintained and the agglomeration of particles of gaseous fluid is postponed, means for conducting gaseous fluid into the lower end of said hollow body while substantially excluding the entry of liquid thereto, and means for rotating said body at a high peripheral speed great enough to project the gaseous fluid through said openings by the centrifugal force developed in the gaseous fluid, said gas when projected from the opening being wiped off against the surrounding liquid in the form of minute bubbles by the high surface speed of the hollow body relative to the contacting wall of liquid.

5. In a means for dispersing a gaseous fluid in a liquid, a hollow rotatable body having a smooth outer surface of revolution, said body being mounted for rotation upon the vertical axis which is the axis of said surface of revolution, said body having a plurality of chambers and substantially radial openings through the walls of the body, said openings terminating flush with the surface of revolution, all of the openings for each chamber terminating at the same radius, a gaseous fluid supply duct having restricted communication with each chamber for controlling the distribution of gaseous fluid to said chambers, and means for maintaining a bath of liquid in which said rotatable body is submerged.

ROBERT G. GUTHRIE.
OSCAR J. WILBOR.